US009688786B2

(12) United States Patent
Fantoni et al.

(10) Patent No.: US 9,688,786 B2
(45) Date of Patent: Jun. 27, 2017

(54) HYPERBRANCHED FLUOROELASTOMER ADDITIVE (75) Inventors: Matteo Fantoni, Rho (IT); Giovanni Comino, Monza (IT); Marco Apostolo, Senago (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 416 days.

(21) Appl. No.: 14/123,931

(22) PCT Filed: Jun. 7, 2012

(86) PCT No.: PCT/EP2012/060786
§ 371 (c)(1),
(2), (4) Date: Dec. 4, 2013

(87) PCT Pub. No.: WO2012/168351
PCT Pub. Date: Dec. 13, 2012

(65) Prior Publication Data
US 2014/0114009 A1 Apr. 24, 2014

(30) Foreign Application Priority Data
Jun. 9, 2011 (EP) .................................... 11169215

(51) Int. Cl.
*C08F 14/26* (2006.01)
*C08F 214/26* (2006.01)
(52) U.S. Cl.
CPC ............ *C08F 14/26* (2013.01); *C08F 214/26* (2013.01); *C08F 214/262* (2013.01); *C08F 214/265* (2013.01)

(58) Field of Classification Search
USPC .................... 526/247, 93; 524/501, 546
See application file for complete search history.

(56) References Cited

U.S. PATENT DOCUMENTS 3,752,787 A  8/1973  De Brunner
3,876,654 A  4/1975  Pattison
(Continued)

FOREIGN PATENT DOCUMENTS

EP    120462 A1   10/1984
EP    136596 A2    4/1985
(Continued)

OTHER PUBLICATIONS

Standard ASTM D4440, "Standard Test Method for Plastics: Dynamic Mechanical Properties Melt Rheology", 2001, p. 1-4.

*Primary Examiner* — Mark Kaucher
*Assistant Examiner* — Henry Hu (57) ABSTRACT

The invention pertains to a hyperbranched (per)fluoroelastomer [fluoroelastomer (B)] comprising recurring units derived from a bis-olefin [bis-olefin (OF)] having general formula (I): wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, said fluoroelastomer (B) having a slope in G' curve such that the ratio: $G'_{100}/G'_{0.01}$ is of less than 10, when determined at 260° C. according to ASTM D4440 standard, wherein G'100 is the storage modulus at a shear rate of 100 rad/sec and $G'_{0.01}$ is the storage modulus at a shear rate of 0.01 rad/sec, to compositions comprising the same, and to a process for their manufacture.

20 Claims, 2 Drawing Sheets

(56) References Cited

U.S. PATENT DOCUMENTS

| | | | |
|---|---|---|---|
| 4,035,565 A | | 7/1977 | Apotheker et al. |
| 4,233,427 A | | 11/1980 | Bargain et al. |
| 4,243,770 A | | 1/1981 | Tatemoto et al. |
| 4,259,463 A | | 3/1981 | Moggi et al. |
| 4,281,092 A | | 7/1981 | Breazeale |
| 4,394,489 A | | 7/1983 | Aufdermarsh |
| 4,564,662 A | | 1/1986 | Albin |
| 4,694,045 A | | 9/1987 | Moore |
| 4,745,165 A | | 5/1988 | Arcella et al. |
| 4,943,622 A | | 7/1990 | Naraki et al. |
| 5,173,553 A | | 12/1992 | Albano et al. |
| 5,447,993 A | | 9/1995 | Logothetis |
| 5,767,204 A | | 6/1998 | Iwa et al. |
| 5,789,489 A | | 8/1998 | Coughlin et al. |
| 5,789,509 A | | 8/1998 | Schmiegel |
| 5,919,878 A | * | 7/1999 | Brothers .............. C08F 214/262 428/421 |
| 6,642,331 B2 | * | 11/2003 | Apostolo .............. C08F 236/20 525/326.3 |
| 2005/0282969 A1 | | 12/2005 | Comino et al. |
| 2007/0208137 A1 | * | 9/2007 | Kaspar .................... C08L 27/16 525/199 |
| 2010/0121012 A1 | * | 5/2010 | Hintzer ................. C08F 214/18 526/247 |
| 2011/0040021 A1 | * | 2/2011 | Kaspar ................ B29C 47/0004 524/520 |

FOREIGN PATENT DOCUMENTS

| | | |
|---|---|---|
| EP | 182299 A2 | 5/1986 |
| EP | 199138 A2 | 10/1986 |
| EP | 335705 A1 | 10/1989 |
| EP | 410351 A1 | 1/1991 |
| EP | 633274 A1 * | 1/1995 |
| EP | 684277 A1 | 11/1995 |
| EP | 784064 A1 | 7/1997 |
| EP | 860436 A1 | 8/1998 |
| EP | 1308467 A2 * | 5/2003 |
| EP | 1457505 A1 * | 9/2004 |
| EP | 1589048 A1 | 10/2005 |
| EP | 1621557 A2 | 2/2006 |
| EP | 1621558 A2 | 2/2006 |
| EP | 1626068 A1 | 2/2006 |
| WO | 9502634 A1 | 1/1995 |
| WO | 9705122 A1 | 2/1997 |
| WO | WO-2007/096347 A1 * | 8/2007 |
| WO | 2008003636 A1 | 1/2008 |
| WO | 2010092021 A1 | 8/2010 |
| WO | 2010092022 A1 | 8/2010 |
| WO | WO-2010/092022 A1 * | 8/2010 |
| WO | 2011073344 A1 | 6/2011 |

* cited by examiner

HYPERBRANCHED FLUOROELASTOMER ADDITIVE

CROSS-REFERENCE TO RELATED APPLICATIONS

This application is a U.S. national stage entry under 35 U.S.C. 0371 of International Application No. PCT/EP2012/060786 filed Jun. 7, 2012, which claims priority to European Application No. 11169215.8, filed Jun. 9, 2011. The entire contents of these applications are explicitly incorporated herein by this reference.

TECHNICAL FIELD

The invention pertain to certain hyperbranched (per)fluoroelastomer additives, to fluoroelastomer compositions comprising the same, and to a process for their manufacture.

BACKGROUND ART

Vulcanized (per)fluoroelastomers are materials with excellent heat-resistance and chemical-resistance characteristics, which are generally used in the manufacture of sealing articles such as oil seals, gaskets, shaft seals and O-rings in which the leaktightness, the mechanical properties and the resistance to substances such as mineral oils, hydraulic fluids, solvents or chemical agents of diverse nature must be ensured over a wide range of working temperatures, from low to high temperatures, and wherein materials might be called to comply with severe requirements in terms of purity, plasma resistance and particles release.

One of the approaches for improving stiffness and mechanical properties is the use of fillers dispersed in the (per)fluoroelastomer matrix from which notably sealing articles can be obtained.

However, when the filler used is carbon black, in particular when it is used at high concentrations, a decline in the leaktightness and elongation at break properties (typical of elastic behaviour) is observed. Also use of carbon black is not possible for use in all those fields wherein high purity is required, e.g. for semi-con applications, for notably manufacturing sealing cured articles chemically compatible with the processes and equipments used during the fabrication of silicon wafers.

Within this latter field of use, the addition of polymeric fillers, in particular based on thermoplastic polymers based on tetrafluoroethylene (TFE), has made it possible to partially overcome such drawbacks: however, the sealing properties obtained with such fillers might still remain unsatisfactory, in particular when targeting sealing articles of high hardness. Further, in addition, the combination of the (per)fluoroelastomer and the filler still provides for a multiphasic mixture which might suffer from interfacial weaknesses, yielding e.g. delamination phenomena at the interfaces, and undergo particles release.

There is thus a continuous need for new additives suitable for being used in (per)fluoroelastomer compounds, which might provide improved mechanical properties (increased tensile module, increased hardness) combined with outstanding sealing properties (low values of compression set), with no risk of particles release nor contamination.

SUMMARY OF INVENTION

Figure 1:
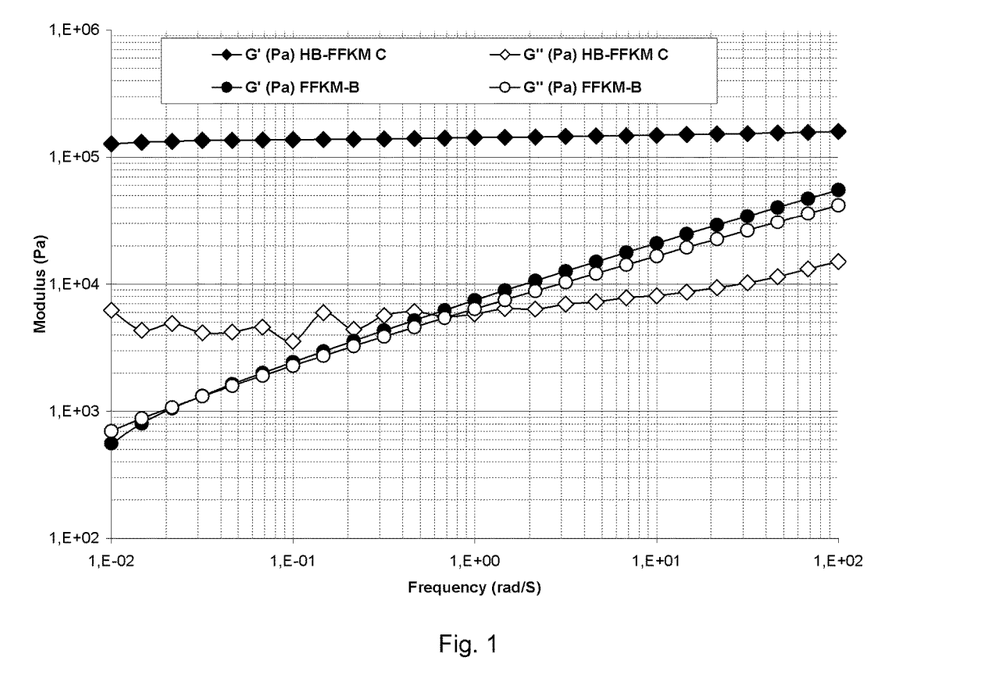
FIG. 1 is a plot of dynamic moduli G' and G" (in Pa) at 260° C. as a function of the frequency (in rad/sec) for the hyperbranched (per)fluoroelastomer HB-FFKM C of Preparative Ex. 3 and for the (per)fluoroelastomer FFKM-B of Preparative Ex. 2.
Figure 2:
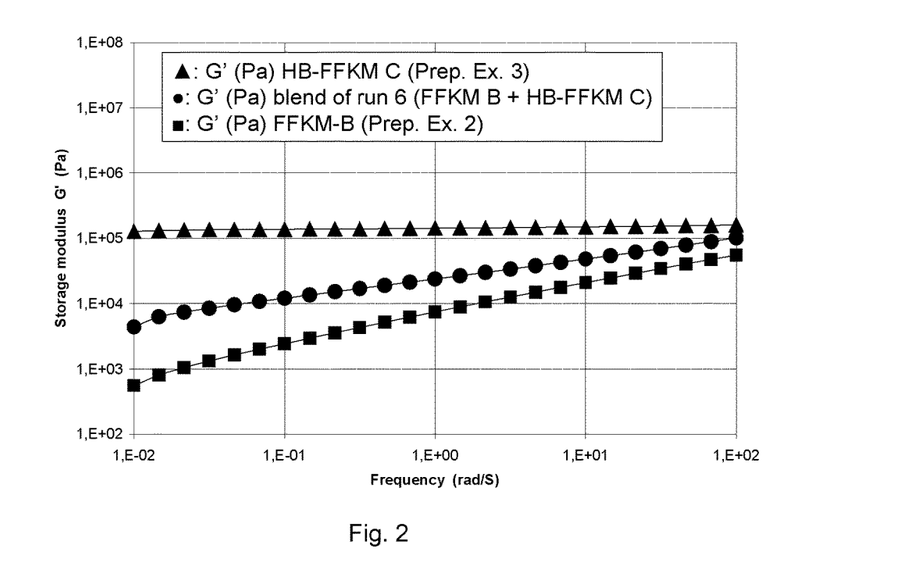
FIG. 2 is a comparison of storage modulus G' (in Pa) at 260° C. as a function of the frequency (in rad/sec) for the hyperbranched (per)fluoroelastomer HB-FFKM C of Preparative Ex. 3, the (per)fluoroelastomer FFKM-B of Preparative Ex. 2, and for their blend of run 6 (100 weight parts of FFKM-B and 25 wt parts of HB-FFKM C).
Figure 3:
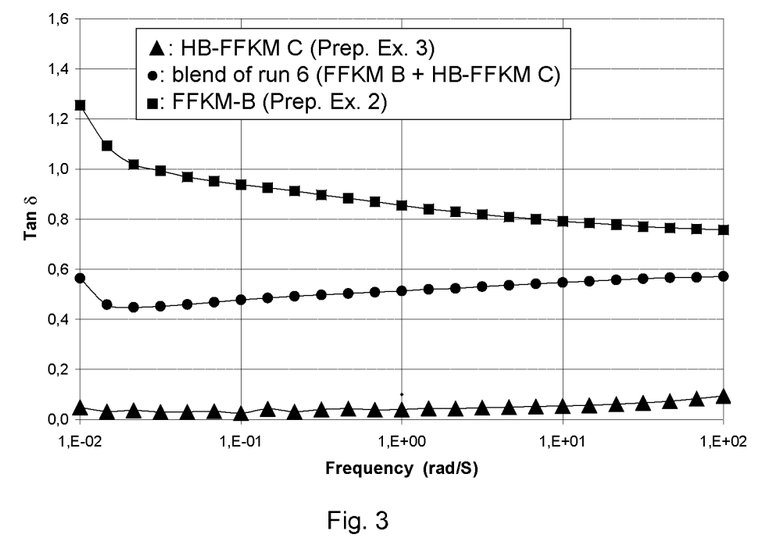
FIG. 3 is a comparison of tan δ at 260° C. as a function of the frequency (in rad/sec) for the hyperbranched (per)fluoroelastomer HB-FFKM C of Preparative Ex. 3, the (per)fluoroelastomer FFKM-B of Preparative Ex. 2, and for their blend of run 6 (100 weight parts of FFKM-B and 25 wt parts of HB-FFKM C).

The Applicant has now found that certain hyperbranched (per)fluoroelastomer can solve above mentioned problems and are particularly effective in improving mechanical and sealing properties of fluoroelastomer host matrices, advantageously providing extremely clean compounds, having generally monophasic behaviour.

It is thus an object of the present invention a hyperbranched (per)fluoroelastomer [fluoroelastomer (B)] comprising recurring units derived from a bis-olefin [bis-olefin (OF)] having general formula:

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, preferably at least partially fluorinated, or a (per)fluoropolyoxyalkylene radical, said fluoroelastomer (B) having a slope in G' curve such that the ratio: $G'_{100}/G'_{0.01}$ is of less than 10, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

The fluoroelastomer (B) as above detailed is advantageously completely miscible within (per)fluoroelastomeric matrices, so that compounds having only one $T_g$, when analyzed by DSC according to ASTM D3418 can be obtained. As a consequence, addition of such an additive cannot generate interfacial discontinuities or other weaknesses points in the composition therefrom.

Further, in addition, despite its complete miscibility in a host (per)fluoroelastomer matrix, the fluoroelastomer (B) as above detailed is advantageously effective in substantially increasing modulus and tensile strength, hardness and high temperature resistance, while simultaneously providing improved sealing properties.

For the purposes of this invention, the term "(per)fluoroelastomer" is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

It is generally understood that the fluoroelastomer (B) is a substantially amorphous polymers, that is to say a polymer having a heat of fusion of less than 5 J/g as measured by ASTM D-3418, preferably less than 4 J/g, more preferably less than 3 J/g.

The fluoroelastomer (B) typically comprises recurring units derived from (per)fluorinated monomers selected from the group consisting of:
(a) $C_2$-$C_8$ perfluoroolefins, such as tetrafluoroethylene (TFE), hexafluoroisobutylene;
(b) hydrogen-containing $C_2$-$C_8$ olefins, such as vinyl fluoride (VF), vinylidene fluoride (VDF), trifluoroethylene (TrFE), perfluoroalkyl ethylenes of formula $CH_2=CH-R_f$, wherein $R_f$ is a $C_1$-$C_6$ perfluoroalkyl group;
(c) $C_2$-$C_8$ chloro and/or bromo and/or iodo-fluoroolefins such as chlorotrifluoroethylene (CTFE);
(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;
(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;
(f) (per)fluorodioxoles having formula:

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably $-CF_3$, $-C_2F_5$, $-C_3F_7$, $-OCF_3$, $-OCF_2CF_2OCF_3$; preferably, perfluorodioxoles;
(g) (per)fluoro-methoxy-vinylethers (MOVE, hereinafter) having formula:

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2=F$, H; preferably $X_2$ is F and $R''_f$ is $-CF_2CF_3$ (MOVE1); $-CF_2CF_2OCF_3$ (MOVE2); or $-CF_3$ (MOVE3).

It is nevertheless generally preferred for fluoroelastomer (B) to comprise recurring units derived from tetrafluoroethylene in combination with recurring units derived from at least one further monomer, generally selected from those of types (a), (d), (e), (f), (g), as above detailed.

Above referred fluoroelastomers (B) being TFE-based copolymers are particularly preferred when the same are used for producing parts of semiconductors manufacturing devices.

Preferred fluoroelastomers (B) within these embodiments will comprise, in addition to recurring units derived from the bis-olefin (OF), as above detailed:
(1) recurring units derived from TFE; and
(2) recurring units derived from at least one perfluorinated comonomer selected from the group consisting of:
perfluoroalkylvinylethers of formula $CF_2=CFOR_{f*}$, wherein $R_{f*}$ is a $C_1$-$C_6$ perfluoroalkyl group, e.g. $CF_3$, $C_2F_5$, $C_3F_7$;
perfluoro-oxy-alkylvinylethers of formula $CF_2=CFOX^*$, wherein $X^*$ is a $C_1$-$C_{12}$ perfluoro-oxyalkyl comprising one or more oxygen atoms, e.g. $CF_2=CF-OCF_2O-CF_2CF_3$ (MOVE1); $CF_2=CF-OCF_2O-CF_2CF_2OCF_3$ (MOVE2); and $CF_2=CF-OCF_2O-CF_3$ (MOVE3).

The fluoroelastomer (B) according to these preferred embodiments will generally comprise recurring units derived from TFE in an amount of 55 to 75% moles, with respect to the total moles of fluoroelastomer (B) different from the bis-olefin (OF), and recurring units derived from said perfluorinated comonomer in an mount of 25 to 45% moles, with respect to the total moles of fluoroelastomer (B) different from the bis-olefin (OF). In preferred embodiments, the fluoroelastomer (B) will not comprise recurring units derived from monomers different from TFE, bis-olefin (OF) and perfluorinated comonomer as above described.

A particular example of a fluoroelastomer (B) which has been found to provide particularly good results is a fluoroelastomer comprising (preferably consisting essentially of) recurring units derived from bis-olefin (OF), TFE and from perfluoromethylvinylether (MVE), MVE being generally comprised in an amount of 25 to 45% moles, with respect to the sum of recurring units derived from TFE and MVE. End chains, defects and minor constituent can enter into the composition of this preferred fluoroelastomer (B) without substantially modifying its properties.

The bis-olefin (OF) of fluoroelastomer (B) is preferably selected from the group consisting of those complying with formulae (OF-1), (OF-2) and (OF-3):

(OF-1)

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

(OF-3)

wherein E, A and B have the same meaning as above defined; R5, R6, R7, equal or different from each other, are H, F or $C_{1-5}$ alkyl or (per)fluoroalkyl group.

The amount of bis-olefin (OF) in the fluoroelastomer (B) is such than the fluoroelastomer (B) is characterized by a slope in G' curve such that the ratio $G'_{100}/G'_{0.01}$ is of less than 10, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

Actually, while direct determination of the amount of bis-olefin (OF), even if possible, requires a tedious analytical procedure, the rheological parameter as above mentioned is a powerful and indirect measurements which can be used for determining the hyperbranched structure having been advantageously obtained.

For the avoidance of doubts, it is understood that the rheological behaviour characterizing fluoroelastomer (B) is to be understood to be evaluated in its uncured state.

Above mentioned conditions for ratio of storage (elastic) modulus G' at low and high shear rate, as above detailed, are representative of a material having a rather flat slope of G' as a function of the shear rate in the region between 0.01 and 100 rad/sec. In other words, the fluoroelastomer (B) of the invention has advantageously a viscoelastic behaviour substantially insensitive to the shear rate: the particular hyperbranched structure is such that essentially no evidence of relaxation motions are observed when modifying rate of deformation in the entire swap range (0.01 to 100 rad/sec): even at very low shear rate (thus longer relaxation/elastic recover times), because of the hyperbranched structures, fluoroelastomers (B) are typically not able to elastically relax more than at higher shear, when shorter relaxation times are provided.

This behaviour is typical of the hyperbranched structure hereby concerned, which makes advantageously fluoroelastomers (B) distinguishable from traditional fluoroelastomer not possessing the hyperbranched structure of the invention, wherein the storage modulus is highly sensitive to shear rate and steadily increases when the same is increased, so that $G'_{100}/G'_{0.01}$ of several decades or more are routinely observed.

The fluoroelastomer (B) possesses a slope in G' curve as a function of shear rate such that the ratio $G'_{100}/G'_{0.01}$ is of preferably less than 5, more preferably less than 2, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

Further, in addition, the fluoroelastomer (B) is further advantageously characterized by the fact that $G'_J$ exceeds $G''_J$, wherein $G'_J$ is the storage modulus at shear rate J, and $G''_J$ is the loss modulus at same shear rate J, said shear rate being comprised between 0.01 and 100 rad/sec, when determined at 260° C. according to ASTM D4440 standard.

This is another rheological property which is typically representative of the hyperbranched structure of the fluoroelastomer (B), including notably no appreciable shear thinning.

Typically the fluoroelastomer (B) is characterized by a ratio $G'_J/G''_J$, wherein $G'_J$, $G''_J$, and J have the meaning as above detailed, of more than 1, preferably of more than 2, more preferably of more than 5.

Otherwise said, the fluoroelastomer (B) is characterized by tan $\delta_J$ of less than 1, preferably less than 0.5, more preferably less than 0.2, wherein tan $\delta_J$ is the value of tan $\delta$ at shear rate J, for J ranging from 0.01 to 100.

Further, in addition, the hyperbranched structure of the fluoroelastomer (B) makes generally the same substantially insoluble in those solvents which are known to otherwise solubilise fluoroelastomers having substantially identical structural features (composition, molecular weight . . . ), but being deprived from recurring units containing said bis-olefin (OF).

Thus, the fluoroelastomer (B), in its uncured state, possesses generally a solubility in perfluoroheptane at 50° C. of less than 10 g/l, preferably less than 5 g/l, more preferably less than 3 g/l.

Without being bound by this theory, the Applicant is of the opinion the above described peculiar viscoelastic behaviour of the hyperbranched structure of the fluoroelastomer (B), as evidenced by dynamic mechanical properties melt rheology determinations and solubility parameter, is indeed responsible for providing an outstanding reinforcing effect when this fluoroelastomer (B) is used and cured within a (per)fluoroelastomeric matrix.

Further, in addition, the amount of bis-olefin (OF) in the fluoroelastomer (B) is advantageously such than the $T_g$ of the fluoroelastomer (B) is at least 20° C., preferably at least 25° C. higher than corresponding fluoroelastomer having substantially identical structural features (composition, molecular weight . . . ), but being deprived from recurring units containing said bis-olefin (OF).

Thus, generally preferred fluoroelastomers (B) will possess a $T_g$, as determined according to ASTM D 3418, of at least 15° C., preferably of at least 18° C., more preferably of at least 20° C.

The invention further pertains to a composition comprising at least one fluoroelastomer (B) as above detailed and at least one (per)fluoroelastomer [fluoroelastomer (A)] different from fluoroelastomer (B) [composition (C)].

The fluoroelastomer (A) generally possesses, in its uncured state, a solubility in perfluoroheptane at a temperature of 50° C. of more than 20 g/l, preferably of more than 40 g/l, even more preferably of more than 70 g/l.

Further in addition the fluoroelastomer (A) advantageously is characterized by ratio $F'_{100}/G'_{0.01}$ is of more than 10, preferably more than 20, even more preferably more than 50, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

Further, in addition, the fluoroelastomer (A) is further advantageously characterized by the fact that for at least one shear rate J, $G'_J$ is smaller than $G''_J$, wherein $G'_J$ is the storage modulus at shear rate J, and $G''_J$ is the loss modulus at same shear rate J, J being comprised between 0.01 and 100 rad/sec, when determined at 260° C. according to ASTM D4440 standard.

Otherwise said, the fluoroelastomer (A) is characterized by tan $\delta_J$ of more than 1, for at least one shear rate ranging from 0.01 and 100; preferably fluoroelastomer (A) possesses a tan $\delta_J$ which, in addition, is comprised between 0.5 and 2, wherein tan $\delta_J$ is the value of tan $\delta$ at shear rate J, for J ranging from 0.01 to 100.

In other words, the fluoroelastomer (A) differs from fluoroelastomer (B) in that it does not possess a hyper-branched structure.

While fluoroelastomer (A) might comprise recurring units derived from the bis-olefin (OF) as above detailed, the amount thereof is limited so as to provide a substantially linear structure which advantageously maintains appreciable solubility and which have a rheological behaviour typical of linear polymers, including relevant shear thinning.

Similarly as explained above for fluoroelastomer (B), for the avoidance of doubts, it is understood that the rheological behaviour characterizing fluoroelastomer (A) is to be understood to be evaluated in its uncured state.

As a consequence of rheological properties of the constituents, the composition (C) generally possesses a slope in G' curve as a function of shear rate such that the ratio $G'_{100}/G'_{0.01}$ is generally comprised between 10 and 30, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

Also in the case of composition (C), for the avoidance of doubts, it is understood that its rheological behaviour is to be understood to be evaluated in its uncured state.

The composition (C) is further characterized by tan $\delta_J$ comprised between 0.2 and 0.7, wherein tan $\delta_J$ is the value of tan $\delta$ at shear rate J, for J ranging from 0.01 to 100.

The composition (C), despite being made of at least two different components, i.e. fluoroelastomer (A) and fluoroelastomer (B) is advantageously a homogeneous mixture; this homogeneous character can be evidenced, e.g. by investigation of its behaviour by DSC, according e.g. to ASTM D 3418: the composition (C) advantageously possesses only one Tg.

As per the monomer composition of fluoroelastomer (A), all features described above for fluoroelastomer (B) also characterized preferred embodiments of fluoroelastomer (A).

Thus, fluoroelastomer (A) typically comprises recurring units derived from (per)fluorinated monomers selected from the group consisting of monomers (a) to (g), as described above.

It is also understood that preferred fluoroelastomers (A), in particular for the manufacture of parts of semi-conductor manufacturing devices comprise recurring units derived from tetrafluoroethylene in combination with recurring units derived from at least one further monomer, generally selected from those of types (a), (d), (e), (f), (g), as above detailed, optionally in combination with recurring units derived from a bis-olefin (OF) and/or from a cure site containing monomer.

Preferred fluoroelastomers (A) within these embodiments will comprise
(1) recurring units derived from TFE; and
(2) recurring units derived from at least one perfluorinated comonomer selected from the group consisting of:
perfluoroalkylvinylethers of formula $CF_2=CFOR_{f^*}$, wherein $R_{f^*}$ is a $C_1$-$C_6$ perfluoroalkyl group, e.g. $CF_3$, $C_2F_5$, $C_3F_7$;
perfluoro-oxy-alkylvinylethers of formula $CF_2=CFOX^*$, wherein $X^*$ is a $C_1$-$C_{12}$ perfluoro-oxyalkyl comprising one or more oxygen atoms, e.g. $CF_2=CF-OCF_2O-CF_2CF_3$ (MOVE1); $CF_2=CF-OCF_2O-CF_2CF_2OCF_3$ (MOVE2); and $CF_2=CF-OCF_2O-CF_3$ (MOVES), and optionally recurring units derived from the bis-olefin (OF), as above detailed.

The fluoroelastomer (A) according to these preferred embodiments will generally comprise TFE in an amount of 55 to 75% moles, with respect to the total moles of fluoroelastomer (A), and said perfluorinated comonomer in an amount of 25 to 45% moles, with respect to the total moles of fluoroelastomer (A).

A particular example of a fluoroelastomer (A) which has been found to provide particularly good results is a fluoroelastomer comprising recurring units derived from bis-olefin (OF), TFE and from perfluoromethylvinylether (MVE), MVE being generally comprised in an amount of 25 to 45% moles, with respect to the sum of recurring units derived from TFE and MVE. End chains, defects and minor constituent can enter into the composition of this preferred fluoroelastomer (A) without substantially modifying its properties.

According to certain preferred embodiments of the invention, the fluoroelastomer (A) comprises cure sites; the selection of cure sites is not particularly critical, provided that they ensure adequate reactive in curing, in particular in peroxide curing.

The fluoroelastomer (A) can comprise said cure sites either as pendant groups bonded to certain recurring units or as end groups of the polymer chain.

Among cure-site containing recurring units, mention can be notably made of:

(CSM-1) iodine or bromine containing monomers of formula:

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a $-(CF_2)_m-$ group, with m being an integer from 3 to 5;

(CSM-2) ethylenically unsaturated compounds comprising cyanide groups, possibly fluorinated.

Among cure-site containing monomers of type (CSM1), preferred monomers are those selected from the group consisting of:

(CSM1-A) iodine-containing perfluorovinylethers of formula:

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) May 17, 1988, U.S. Pat. No. 4,564,662 (MINNESOTA MINING & MFG [US]) Jan. 14, 1986 and EP 199138 A (DAIKIN IND LTD) Oct. 29, 1986); and (CSM-1B) iodine-containing ethylenically unsaturated compounds of formula:

$$CX^1X^2=CX^3-(CF_2CF_2)-I$$

wherein each of $X^1$, $X^2$ and $X^3$, equal to or different from each other, are independently H or F; and p is an integer from 1 to 5; among these compounds, mention can be made of $CH_2=CHCF_2CF_2I$, $I(CF_2CF_2)_2CH=CH_2$, $ICF_2CF_2CF=CH_2$, $I(CF_2CF_2)_2CF=CH_2$;
(CSM-1C) iodine-containing ethylenically unsaturated compounds of formula:

$$CHR=CH-Z-CH_2CHR-I$$

wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of $CH_2=CH-(CF_2)_4-CH_2CH_2I$, $CH_2=CH-(CF_2)_6CH_2CH_2I$, $CH_2=CH-(CF_2)_8CH_2CH_2I$, $CH_2=CH-(CF_2)_2CH_2CH_2I$;
(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) Jul. 12, 1977 or other compounds bromo and/or iodo alpha-olefins disclosed in U.S. Pat. No. 4,694,045 (DU PONT) Sep. 15, 1987.

Among cure-site containing monomers of type (CSM2), preferred monomers are those selected from the group consisting of:
(CSM2-A) perfluorovinyl ethers containing cyanide groups of formula $CF_2=CF-(OCF_2CFX^{CN})_m-O-(CF_2)_n-CN$, with $X^{CN}$ being F or $CF_3$, m being 0, 1, 2, 3 or 4; n being an integer from 1 to 12;
(CSM2-B) perfluorovinyl ethers containing cyanide groups of formula $CF_2=CF-(OCF_2CFX^{CN})_{m'}-O-CF_2-CF(CF_3)-CN$, with $X^{CN}$ being F or $CF_3$, m' being 0, 1, 2, 3 or 4.

Specific examples of cure-site containing monomers of type CSM2-A and CSM2-B suitable to the purposes of the present invention are notably those described in U.S. Pat. No. 4,281,092 (DU PONT) Jul. 28, 1981, U.S. Pat. No. 4,281,092 (DU PONT) Jul. 28, 1981, U.S. Pat. No. 5,447,993 (DU PONT) Sep. 5, 1995 and U.S. Pat. No. 5,789,489 (DU PONT) Aug. 4, 1998.

Preferably, fluoroelastomer (A) of the invention comprises iodine or bromine cure sites in an amount of 0.001 to 10% wt. Among these, Iodine cure sites are those selected for maximizing curing rate.

According to this embodiment, for ensuring acceptable reactivity it is generally understood that the content of iodine and/or bromine in the fluoroelastomer (A) should be of at least 0.05% wt, preferably of at least 0.1% weight, more preferably of at least 0.15% weight, with respect to the total weight of fluoroelastomer (A).

On the other side, amounts of iodine and/or bromine not exceeding preferably 7% wt, more specifically not exceeding 5% wt, or even not exceeding 4% wt, with respect to the total weight of fluoroelastomer (A), are those generally selected for avoiding side reactions and/or detrimental effects on thermal stability.

These iodine or bromine cure sites of these preferred embodiments of the invention might be comprised as pending groups bound to the backbone of the fluoroelastomer (A) polymer chain or might be comprised as terminal groups of said polymer chain.

According to a first embodiment, the iodine and/or bromine cure sites are comprised as pending groups bound to the backbone of the fluoroelastomer polymer chain; the fluoroelastomer (A) according to this embodiment typically comprises recurring units derived from brominated and/or iodinated cure-site comonomers selected from:
bromo and/or iodo alpha-olefins containing from 2 to 10 carbon atoms such as bromotrifluoroethylene or bromotetrafluorobutene described, for example, in U.S. Pat. No. 4,035,565 (DU PONT) Jul. 12, 1977 or other compounds bromo and/or iodo alpha-olefins disclosed in U.S. Pat. No. 4,694,045 (DU PONT) Sep. 15, 1987;
iodo and/or bromo fluoroalkyl vinyl ethers (as notably described in U.S. Pat. No. 4,745,165 (AUSIMONT SPA) May 17, 1988, U.S. Pat. No. 4,564,662 (MINNESOTA MINING & MFG [US]) Jan. 14, 1986 and EP 199138 A (DAIKIN IND LTD) Oct. 29, 1986).

The fluoroelastomer according to this embodiment generally comprises recurring units derived from brominated and/or iodinated cure-site monomers in amounts of 0.05 to 5 mol per 100 mol of all other recurring units of the fluoroelastomer, so as to advantageously ensure above mentioned iodine and/or bromine weight content.

According to a second preferred embodiment, the iodine and/or bromine cure sites are comprised as terminal groups of the fluoroelastomer polymer chain; the fluoroelastomer according to this embodiment is generally obtained by addition to the polymerization medium during fluoroelastomer manufacture of anyone of:
iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ (see, for example, U.S. Pat. No. 4,243,770 (DAIKIN IND LTD) Jan. 6, 1981 and U.S. Pat. No. 4,943,622 (NIPPON MEKTRON KK) Jul. 24, 1990); and
alkali metal or alkaline-earth metal iodides and/or bromides, such as described notably in U.S. Pat. No. 5,173,553 (AUSIMONT SRL) Dec. 22, 1992.

Composition (C) as above detailed can be manufactured by any method suitable for thoroughly mixing fluoroelastomer (B) and fluoroelastomer (A) as above detailed, including notably powder mixing, melt compounding, latex blending etc. . . . .

According to a preferred embodiment, the process for manufacturing composition (C) advantageously comprises mixing an aqueous dispersion of fluoroelastomer (A) and an aqueous dispersion of fluoroelastomer (B) and co-coagulating the same for yielding composition (C).

A preferred variant of this embodiment includes manufacturing aqueous dispersions of fluoroelastomer (A) and fluoroelastomer (B) in a staged polymerization process, so as to obtain directly from polymerization a blend of an aqueous dispersion of fluoroelastomer (A) and an aqueous dispersion of fluoroelastomer (B). Said staged polymerization can be carried out in order to firstly manufacture fluoroelastomer (A) and then manufacturing fluoroelastomer (B) or vice-versa, that is to say to firstly manufacture fluoroelastomer (B) and then manufacturing fluoroelastomer (A). This second procedure might be advantageous to the aim of ensuring appropriate dosage of the bis-olefin required to achieve the expected hyperbranched structure. As a result, the composition (C) of the invention might result in a core-shell structure comprising a core of fluoroelastomer (B) at least partially surrounded by a shell of fluoroelastomer (A).

The invention also pertains to the use of the composition (C) comprising fluoroelastomer (B) and fluoroelastomer (A) as above described for fabricating shaped articles.

The inventive composition (C) can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer into a finished article made of non-tacky, strong, insoluble, chemically and thermally resistant cured fluoroelastomer.

The composition (C) of the invention is advantageously cured by peroxide curing technique, by ionic technique, by tin-catalyzed curing or by a mixed peroxidic/ionic technique.

The peroxide curing is typically performed according to known techniques via addition of suitable peroxide that is capable of generating radicals by thermal decomposition. Organic peroxides are generally employed.

Still an object of the invention is thus a peroxide curable composition [composition (PC)] comprising fluoroelastomer (A), fluoroelastomer (B), as above detailed and at least one peroxide, typically an organic peroxide.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136596 A (MONTEDISON SPA) Apr. 10, 1985 and EP 410351A (AUSIMONT SRL) Jan. 30, 1991, whose content is hereby incorporated by reference.

Other ingredients generally comprised in the peroxide curable composition [composition (PC)], as above detailed, are:
(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) Aug. 26, 1998 and WO 97/05122 (DUPONT) Feb. 13, 1997; among above mentioned curing coagents, TAIC and bis-olefins (OF), as above detailed, and more specifically those of formula (OF-1), as above detailed, have been found to provide particularly good results;
(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;
(c) optionally, acid acceptors of the metal non-oxide type, such as 1,8-bis(dimethylamino)naphthalene, octadecylamine, etc., as notably described in EP 708797 A (DU PONT) May 1, 1996;
(d) optionally, other conventional additives, such as fillers, thickeners, pigments, antioxidants, stabilizers, processing aids, and the like.

Ionic curing can be achieved by mixing to the composition (C) one or more curing agent and one or more accelerator suitable for ionic curing, as well known in the art.

Still an object of the invention is thus an ionically curable composition comprising fluoroelastomer (A), fluoroelastomer (B) as above detailed and at least one curing agent and at least one accelerator [composition (IC)].

The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A (MINNESOTA MINING & MFG [US]') Oct. 4, 1989 and U.S. Pat. No. 4,233,427 (RHONE POULENC IND) Nov. 11, 1980. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING & MFG [US]+) Oct. 4, 1989 and U.S. Pat. No. 3,876,654 (DU PONT) Apr. 8, 1975); aminophosphonium salts (see, e.g., U.S. Pat. No. 4,259,463 (MONTEDISON SPA) Mar. 31, 1981); phosphoranes (see, e.g., U.S. Pat. No. 3,752,787 (DU PONT) Aug. 14, 1973); imine compounds of formula $[Ar_3P-N=PAr_3]^{+n}X^{n-}$, with Ar being an aryl group, n=1 or 2 and X being a n-valent anion as described in EP 0120462 A (MONTEDISON SPA) Oct. 3, 1984 or of formula $[(R_3P)_2N]^+X^-$, with R being an aryl or an alkyl group, and X being a monovalent anion, e.g. as described in EP 0182299 A (ASAHI CHEMICAL IND) May 28, 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) Nov. 29, 1995, which is included herein in its entirety by reference.

Other ingredients generally added to the ionically curable composition [composition (IC)], when curing via ionic route are:

i) one or more mineral acid acceptors chosen from those known in the ionic curing of vinylidene fluoride copolymers, typically comprised in amounts of 1-40 parts per 100 parts of fluoroelastomer (A);

ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A). Also, other conventional additives, such as fillers, thickeners, pigments, antioxidants, stabilizers and the like, may then be added to the curing mixture.

Mixed peroxidic/ionic curing can be achieved by simultaneously introducing in the curable composition one or more peroxide, as above detailed, and one or more curing agent and one or more accelerator suitable for ionic curing, as well known in the art.

When the fluoroelastomer (A) comprises recurring units derived from ethylenically unsaturated compounds comprising cyanide groups of type (CSM-2) as above detailed, organotin compounds or diaromatic amine compounds, as notably described in U.S. Pat. No. 4,394,489 (DU PONT) Jul. 19, 1983 (disclosing allyl-, propargyl- and allenyl-tin curatives), U.S. Pat. No. 5,767,204 (NIPPON MEKTRON KK) Jun. 16, 1998 (providing bis(aminophenyl) compounds represented by formula:

wherein A is an alkylidene group having 1 to 6 carbon atoms or a perfluoroalkylidene group having 1 to 10 carbon atoms and X and Y are a hydroxyl group or an amino group) and U.S. Pat. No. 5,789,509 (DU PONT) Aug. 4, 1998 (disclosing tetraalkyltin, tetraaryltin compounds, bis(aminophenols) and bis(aminothiophenols)). This type of vulcanization may be combined with a vulcanization of peroxide type, in the case where the fluoroelastomer matrix contains iodinated and/or brominated end groups, as described notably in U.S. Pat. No. 5,447,993 (DU PONT) Sep. 5, 1995.

Finally, the invention pertains to cured articles obtained from the composition (C). Said cured articles are generally obtained by moulding and curing the curable composition, as above detailed.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Raw Materials
Manufacture of Perfluoroelastomers Raw Gums

Example 1—Manufacture of TFE/MVE Perfluoroelastomer 34/66 Mol/Mol (FFKM-A, Hereinafter)

In a 22-liters autoclave equipped with mechanical stirrer operating at 460 rpm, 14 liters of demineralized water and 140 ml of a microemulsion preliminarily obtained by mixing 30.5 ml of a perfluoropolyether having carboxylic end-group of formula: $CF_2ClO(CF_2—CF(CF_3)O)_n(CF_2O)_mCF_2COOH$, with n/m=10 and average molecular weight of 600 g/mol; 30.5 ml of a $NH_4OH$ 30% v/v aqueous solution; 61 ml of demineralized water; 18 ml of a GALDEN® D02 perfluoropolyether of formula: $C—F—_3—O—(—CF_2—CF(CF_3)O)_n(CF_2O)_mCF_3$ with n/m=20 and molecular weight of 450 g/mol, were introduced.

Reactor was thus heated to set-point temperature of 80° C.; then 45 g of 1,4-diiodoperfluorobutane ($C_4F_8I_2$) were added, followed by a monomers mixtures having following composition: tetrafluoroethylene (TFE) 62% moles, perfluoromethylvinylether (MVE) 38% moles until a final pressure of 20 bar (2 MPa), 0.7 g of ammonium persulfate (APS) and 22 g of $CH_2=CH—(CF_2)_6—CH=CH_2$, fed in 20 portions each 5% increase in conversion. Set-point pressure of 20 bar was maintained by feeding a monomers mixture composed of TFE 60.5% moles, MVE 39.5% moles; after having fed 7.7 kg of monomers mixture (corresponding to a total reaction time of 374 minutes), reactor was cooled and a latex comprising 382 $g_{polymer}$/kg latex was recovered. Latex was then coagulated and purified under the form of a gel following procedure described in EP 1626068 A (SOLVAY SOLEXIS SPA [IT]) Feb. 15, 2006. After drying at 90° C. for 16 hours, a polymer composed of MVE 34% moles, TFE 66% moles was obtained. This material was found to possess a solubility in GALDEN® D80 (perfluoroheptane) at a temperature of 50° C. of more than 95 g/l.

Example 2—Manufacture of TFE/MVE Perfluoroelastomer 30/70 Mol/Mol (FFKM-B, Hereinafter)

Same procedure of Example 1 was repeated but using a feeding monomers mixture composed of TFE 66% moles, MVE 34% moles. Reaction was pursued during 250 minutes, obtaining latex having a solids content of 338 $g_{polymer}$/$kg_{latex}$. Latex was then coagulated and purified as above detailed. After drying at 90° C. for 16 hours, a polymer composed of MVE 30% moles, TFE 70% moles was obtained. This material was found to possess a solubility in GALDEN® D80 (perfluoroheptane) at a temperature of 50° C. of more than 70 g/l.

Manufacture of Hyperbranched Fluoroelastomers

Example 3—Manufacture of Hyperbranched TFE/MVE Perfluoroelastomer (HB-FFKM C, Herein Below)

In a 10-liters autoclave equipped with mechanical stirrer operating at 545 rpm, 6 liters of demineralized water and 60 ml of a microemulsion preliminarily obtained by mixing 13.1 ml of a perfluoropolyether having carboxylic end-group of formula: $CF_2ClO(CF_2-CF(CF_3)O)_n(CF_2O)_mCF_2COOH$, with n/m=10 and average molecular weight of 600 g/mol; 13.1 ml of a $NH_4OH$ 30% v/v aqueous solution; 26.1 ml of demineralized water; 7.7 ml of a GALDEN® D02 perfluoropolyether of formula: $C-F_3-O-(-CF_2-CF(CF_3)O)_n(CF_2O)_mCF_3$ with n/m=20 and molecular weight of 450 g/mol, were introduced.

Reactor was thus heated to set-point temperature of 80° C.; then 15.5 g of 1,4-diiodoperfluorobutane ($C_4F_8I_2$) were added, followed by a monomers mixtures having following composition: tetrafluoroethylene (TFE) 62% moles, perfluoromethylvinylether (MVE) 38% moles until a final pressure of 20 bar (2 MPa), 0.9 g of ammonium persulfate (APS) and 34.05 ml of $CH_2=CH-(CF_2)_6-CH=CH_2$, fed in 20 portions each 5% increase in conversion.

Set-point pressure of 20 bar was maintained by feeding a monomers mixture composed of TFE 66% moles, MVE 34% moles; after having fed 1.75 kg of monomers mixture (corresponding to a total reaction time of 467 minutes), reactor was cooled and a latex comprising 195 $g_{polymer}/kg_{latex}$ was recovered. Latex was then coagulated and purified under the form of a gel following procedure as detailed in Ex. 1.

A hyperbranched fluoroelastomer having a $T_g$ of 29.3° C., an enthalpy of fusion of 2.34 J/g was obtained. This material was found to possess a solubility in GALDEN® D80 (perfluoroheptane) at a temperature of 50° C. of less than 3 g/l and when characterized by dynamic rheology according to ASTM D4440, was found to possess G'>G" and tan δ smaller than 0.2 in the whole experimental window from 0.01 to 100 rad/sec and furthermore a $G'_{100}/G'_{0.01}$ ratio smaller than 5.

Example 4—Manufacture of Hyperbranched TFE/MVE Perfluoroelastomer (HB-FFKM D, Herein Below)

Same procedure of Example 3 was repeated but using 70 ml of $CH_2=CH-(CF_2)_6-CH=CH_2$, fed in 20 portions each 5% increase in conversion. Reaction was pursued during 267 minutes, obtaining latex having a solids content of 164 $g_{polymer}/kg_{latex}$. Latex was then coagulated and purified as above detailed.

A hyperbranched fluoroelastomer having a Tg of 48.7° C., an enthalpy of fusion of 4.69 J/g was obtained. This material was found to possess a solubility in Galden D80 (perfluoroheptane) at a temperature of 50° C. of less than 3 g/l and when characterized by dynamic rheology according to ASTM D4440, was found to possess G'>G" and tan δ smaller than 0.2 in the whole experimental window from $10^{-2}$ to $10^2$ rad/sec and furthermore a $G'(10^2 \text{ rad/sec})/G'(10^{-2} \text{ rad/sec})$ ratio smaller than 5.

Sealing and Mechanical Properties Determination on Cured Samples

Perfluoroelastomers were pre-compounded with the additives and all ingredients in the table using an open roll mill. O-rings (size class=214) have been cured in a pressed mould and then post-treated in an air circulating oven in conditions (time, temperature) specified in the Table below.

Cure behaviour was determined according to ASTM D-6601, at a temperature of 160° C., by determining the following properties:
$M_L$=Minimum torque (lb*in)
$M_H$=Maximum torque (lb*in)
$t_{S2}$=Time for two units rise from $M_L$ (sec);
$t'_2$=Time to 2% state of cure (sec);
$t'_{50}$=Time to 50% state of cure (sec);
$t'_{90}$=Time to 90% state of cure (sec)

Plaques were cured in a pressed mould and then post-treated in an air circulating oven in conditions (time, temperature) below specified.

The tensile properties have been determined on specimens punched out from the plaques, according to the DIN 53504 S2 Standard.

M100 is the tensile strength in MPa at an elongation of 100%;

TS is the tensile strength in MPa;

EB is the elongation at break in %.

The Shore A hardness (3") (HDS) has been determined on 3 pieces of plaque piled according to the ASTM D 2240 method.

Compression set values have been determined either on O-ring, specimen following standard AS568A (type 214) or on 6 mm buttons (type 2), according to the ASTM D 395, method B, assembling 3 disks punched out from piled plaques.

Curing recipes and conditions and properties of cured sample are summarized, respectively, in tables 1 and 2 for compositions based on FFKM-A and FFKM-B as base raw gum.

TABLE 1

| Run | | 1C | 2 | 3 | 4 |
|---|---|---|---|---|---|
| | | Elastomer | | | |
| FFKM-A | phr | 100 | 75 | 90 | 75 |
| HB-FFKM-C | phr | — | 25 | 10 | — |
| HB-FFKM-D | phr | — | — | — | 25 |
| | | DSC | | | |
| Tg | ° C. | n.d. | −0.6 | n.d. | 0.2 |
| | | Other ingredients | | | |
| Bis-olefin(*) | phr | 1.5 | 1.5 | 1.5 | 1.5 |
| Peroxide(**) | phr | 2 | 2 | 2 | 2 |
| | | MDR 12 min @ 160 C. | | | |
| $M_L$ | lb*in | 1.10 | 1.40 | 1.21 | 1.79 |
| $M_H$ | lb*in | 11.00 | 14.13 | 12.24 | 16.39 |
| $t_{S2}$ | sec | 85 | 72 | 81 | 73 |
| $t'_2$ | sec | 47 | 45 | 47 | 47 |
| $t'_{50}$ | sec | 130 | 119 | 130 | 134 |
| $t'_{90}$ | sec | 275 | 254 | 277 | 314 |
| Mechanical Properties at room temperature (23° C.) | | | | | |
| Molding and post-curing conditions | | | | | |
| Press cure | | 10 min at 160° C. | | | |
| Post cure | | (8 + 16)h at 250° C. | | | |
| Tensile Strength | MPa | 11.0 | 11.1 | 12.5 | 14.0 |
| 100% Modulus | MPa | 1.6 | 4.0 | 2.8 | 7.9 |
| Elongation @ Break | % | 274 | 167 | 216 | 139 |
| Hardness (Shore A) | pts | 56 | 73 | 64 | 82 |
| Sealing properties | | | | | |
| Molding and post-curing conditions | | | | | |
| Press cure | | 10 min at 170° C. | | | |
| Post Cure | | (8 + 16)h at 250° C. | | | |
| C-set 70 h at 200° C. (6 mm button) | % | 35 | 13 | 15 | 16 |

TABLE 1-continued

| Run | | 1C | 2 | 3 | 4 |
|---|---|---|---|---|---|
| C-set 70 h at 250° C. (6 mm button) | % | n.d. | 21 | 20 | 35 |
| C-set 70 h at 300° C. (O-ring) | % | failed | 31 | 36 | failed |

(*)Crosslinking agent: $CH_2=CH-(CF_2)_4-CH=CH_2$
(**)Catalyst agent: LUPEROX® 101, neat 2,5-dimethyl-2,5-di(t-butylperoxy)hexane ($C_{16}H_{34}O_4$).
n.d. = not determined

TABLE 1

| Run | | 5C | 6 | 7 | 8 |
|---|---|---|---|---|---|
| Elastomer | | | | | |
| FFKM B | phr | 100 | 75 | 90 | 75 |
| HB-FFKM C | phr | — | 25 | 10 | — |
| HB-FFKM D | phr | — | — | — | 25 |
| DSC | | | | | |
| Tg | ° C. | n.d. | 4.9 | n.d. | 5.0 |
| Other ingredients | | | | | |
| Bis-olefin(*) | phr | 1.5 | 1.5 | 1.5 | 1.5 |
| Peroxide(**) | phr | 2 | 2 | 2 | 2 |
| MDR 12 min @ 160 C. | | | | | |
| $M_L$ | lb*in | 1.68 | 1.47 | 1.77 | 1.75 |
| $M_H$ | lb*in | 12.65 | 15.53 | 12.49 | 15.94 |
| $t_{s2}$ | sec | 76 | 63 | 76 | 72 |
| $t'_2$ | sec | 46 | 40 | 47 | 47 |
| $t'_{50}$ | sec | 121 | 114 | 121 | 132 |
| $t'_{90}$ | sec | 262 | 242 | 262 | 310 |
| Mechanical Properties at room temperature (23° C.) | | | | | |
| Molding and post-curing conditions | | | | | |
| Press cure | | 10 min at 160° C. | | | |
| Post cure | | (8 + 16)h at 250° C. | | | |
| Tensile Strength | MPa | 18.8 | 15.4 | 17.7 | 20.4 |
| 100% Modulus | MPa | 3.5 | 5.8 | 4.2 | 9.6 |
| Elongation @ Break | % | 217 | 164 | 198 | 153 |
| Hardness (Shore A) | pts | 70 | 80 | 74 | 86 |
| Sealing properties | | | | | |
| Molding and post-curing conditions | | | | | |
| Press cure | | 10 min at 170° C. | | | |
| Post Cure | | (8 + 16)h at 250° C. | | | |
| C-set 70 h at 200° C. (6 mm button) | % | 17 | 17 | 15 | 19 |
| C-set 70 h at 250° C. (6 mm button) | % | 28 | 23 | 22 | 39 |
| C-set 70 h at 300° C. (O-ring) | % | failed | 33 | 38 | failed |

(*)Crosslinking agent: $CH_2=CH-(CF_2)_4-CH=CH_2$
(**)Catalyst agent: LUPEROX® 101, neat 2,5-dimethyl-2,5-di(t-butylperoxy)hexane ($C_{16}H_{34}O_4$),
n.d. = not determined

The invention claimed is:

1. A hyperbranched (per)fluoroelastomer [fluoroelastomer (B)] comprising recurring units derived from a bis-olefin [bis-olefin (OF)] having general formula:

wherein $R_1$, $R_2$, $R_3$, $R_4$, $R_5$ and $R_6$, equal or different from each other, are H or $C_1$-$C_5$ alkyl; Z is a linear or branched $C_1$-$C_{18}$ alkylene or cycloalkylene radical, optionally containing oxygen atoms, optionally at least partially fluorinated, or a (per)fluoropolyoxyalkylene radical, said fluoroelastomer (B) having a slope in G' curve such that the ratio: $G'_{100}/G'_{0.01}$ is less than 10, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

2. The fluoroelastomer (B) of claim 1, comprising recurring units derived from (per)fluorinated monomers selected from the group consisting of:
 (a) $C_2$-$C_8$ perfluoroolefins;
 (b) hydrogen-containing $C_2$-$C_8$ olefins;
 (c) $C_2$-$C_8$ chloro and/or bromo and/or iodo-fluoroolefins;
 (d) (per)fluoroalkylvinylethers of formula $CF_2=CFOR_f$ wherein $R_f$ is a $C_1$-$C_6$ (per)fluoroalkyl group;
 (e) (per)fluoro-oxy-alkylvinylethers of formula $CF_2=CFOX$, wherein X is a $C_1$-$C_{12}$ ((per)fluoro)-oxyalkyl comprising catenary oxygen atoms;
 (f) (per)fluorodioxoles having formula:

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;
 (g) (per)fluoro-methoxy-vinylethers having formula:

wherein $R''_f$ is selected from linear or branched $C_1$-$C_6$ (per)fluoroalkyls; $C_5$-$C_6$ cyclic (per)fluoroalkyls; and linear or branched $C_2$-$C_6$ (per)fluorooxyalkyls comprising from 1 to 3 catenary oxygen atoms, and each $X_2$ is independently selected from F and H.

3. The fluoroelastomer (B) of claim 2, comprising recurring units derived from bis-olefin (OF), from tetrafluoroethylene (TFE) and from perfluoromethylvinylether (MVE), MVE being generally comprised in an amount of 25 to 45% moles, with respect to the sum of recurring units derived from TFE and MVE.

4. The fluoroelastomer (B) of claim 2, comprising recurring units derived from (per)fluorinated monomers selected from the group consisting of: tetrafluoroethylene; hexafluoroisobutylene; vinyl fluoride; vinylidene fluoride; trifluoroethylene; perfluoroalkyl ethylenes of formula $CH_2=CH-R_f$, wherein $R_f$ is a $C_1$-$C_6$ perfluoroalkyl group; chlorotrifluoroethylene; (per)fluoroalkylvinylethers of formula $CF_2=CFOR_f$ wherein $R_f$ is selected from $CF_3$, $C_2F_5$, and $C_3F_7$; (per)fluoro-oxy-alkylvinylethers of formula $CF_2=CFOX$, wherein X is perfluoro-2-propoxypropyl; (f) (per)fluorodioxoles having formula:

wherein $R_{f3}$, $R_{f4}$, $R_{f5}$, $R_{f6}$ are each independently selected from —$CF_3$, —$C_2F_5$, —$C_3F_7$, —$OCF_3$, —$OCF_2CF_2OCF_3$; and (per)fluoro-methoxy-vinylethers having formula:

wherein $X_2$ is F and $R''_f$ is selected from —$CF_2CF_3$, —$CF_2CF_2OCF_3$, and —$CF_3$.

5. The fluoroelastomer (B) of claim 1, wherein said bis-olefin (OF) is selected from the group consisting of compounds of formulae (OF-1), (OF-2) and (OF-3):

(OF-1)

wherein j is an integer between 2 and 10, and R1, R2, R3, R4, equal or different from each other, are H, F or a $C_{1-5}$ alkyl or (per)fluoroalkyl group;

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages;

(OF-3)

wherein E, A and B have the same meaning as above defined; R5, R6, R7, equal or different from each other, are H, F or a $C_{1-5}$ alkyl or (per)fluoroalkyl group.

6. The fluoroelastomer (B) of claim 5, wherein E is a —$(CF_2)_m$— group, wherein m is an integer from 3 to 5.

7. The fluoroelastomer (B) of claim 1, possessing a slope in G' curve as a function of shear rate such that the ratio $G'_{100}/G'_{0.01}$ is less than 5 when determined at 260° C. according to ASTM D4440 standard.

8. The fluoroelastomer (B) of claim 7, possessing a slope in G' curve as a function of shear rate such that the ratio $G'_{100}/G'_{0.01}$ is less than 2, when determined at 260° C. according to ASTM D4440 standard.

9. The fluoroelastomer (B) of claim 1, said fluoroelastomer (B) being characterized by the fact that $G'_J$ exceeds $G''_J$, wherein $G'_J$ is the storage modulus at shear rate J, and $G''_J$ is the loss modulus at same shear rate J, said shear rate being comprised between 0.01 and 100 rad/sec, when determined at 260° C. according to ASTM D4440 standard.

10. The fluoroelastomer (B) of claim 9, characterized by a ratio $G'_J/G''_J$ of more than 5.

11. The fluoroelastomer (B) according to claim 1, possessing in its uncured state a solubility in perfluoroheptane at 50° C. of less than 10 g/l.

12. The fluoroelastomer (B) according to claim 11, possessing in its uncured state a solubility in perfluoroheptane at 50° C. of less than 5 g/l.

13. A composition comprising at least one fluoroelastomer (B) according to claim 1 and at least one (per)fluoroelastomer [fluoroelastomer (A)] different from fluoroelastomer (B) [composition (C)].

14. The composition (C) according to claim 13, possessing a slope in G' curve as a function of shear rate such that the ratio $G'_{100}/G'_{0.01}$ is generally comprised between 10 and 30, when determined at 260° C. according to ASTM D4440 standard, wherein $G'_{100}$ is the storage modulus at a shear rate of 100 rad/sec and $G'_{0.01}$ is the storage modulus at a shear rate of 0.01 rad/sec.

15. The composition (C) according to claim 13, being characterized by tan $\delta_J$ comprised between 0.2 and 0.7, wherein tan $\delta_J$ is the value of tan $\delta$ at shear rate J, for J ranging from 0.01 to 100.

16. A process for manufacturing the composition (C) according to claim 13, said process comprising mixing an aqueous dispersion of fluoroelastomer (A) and an aqueous dispersion of fluoroelastomer (B) and co-coagulating the same for yielding composition (C).

17. A process according to claim 16, said process comprising manufacturing said aqueous dispersion of fluoroelastomer (A) and said aqueous dispersion of fluoroelastomer (B) in a staged polymerization process, so as to obtain directly from polymerization a blend of an aqueous dispersion of fluoroelastomer (A) and an aqueous dispersion of fluoroelastomer (B).

18. A method for fabricating shaped articles, the method comprising moulding, calendering, or extruding the composition (C) according to claim 13, such that a shaped article is fabricated.

19. A peroxide curable composition [composition (PC)] comprising the composition according to claim 13 and at least one peroxide.

20. An ionically curable composition [composition (IC)] comprising the composition according to claim 13, at least one curing agent and at least one accelerator.

* * * * *